E. B. KNAPP.
HARNESS HOOK.
APPLICATION FILED AUG. 4, 1915.

1,211,320.

Patented Jan. 2, 1917.

Witnesses
Frederick W. Ely
John J. McCarthy

Inventor
E. B. Knapp,
By Victor J. Evans
Attorney

UNITED STATES PATENT OFFICE.

EDWARD B. KNAPP, OF SAN JACINTO, CALIFORNIA, ASSIGNOR TO ADA BLANCHE KNAPP, OF SAN JACINTO, CALIFORNIA.

HARNESS-HOOK.

1,211,320.      Specification of Letters Patent.      Patented Jan. 2, 1917.

Application filed August 4, 1915. Serial No. 43,643.

*To all whom it may concern:*

Be it known that I, EDWARD B. KNAPP, a citizen of the United States, residing at San Jacinto, in the county of Riverside and State of California, have invented new and useful Improvements in Harness-Hooks, of which the following is a specification.

This invention relates to improvements in harness hooks and has particular application to a trace hook.

In carrying out the present invention, it is my purpose to provide a hook of the class described which may be used at either end of the trace and which will be constructed in such manner that accidental disconnection between the hook and the trace will be prevented.

It is also my purpose to improve and simplify the general construction of trace hooks and to provide a trace hook which will be found especially useful in conjunction with the trace chains.

With the above and other objects in view, the invention consists in the construction, combination and arrangement of parts hereinafter set forth in and falling within the scope of the claims.

Figure 1:
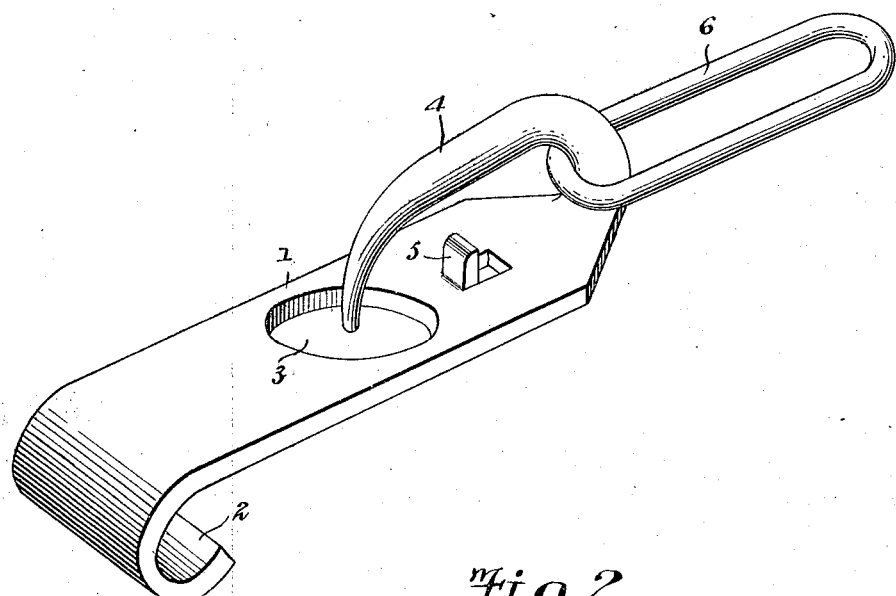
Figure 2:
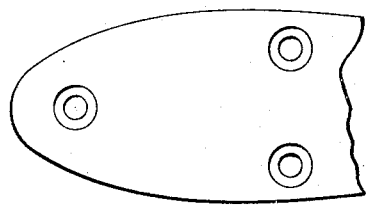

In the accompanying drawing, Figure 1 is a perspective view of a trace hook constructed in accordance with the present invention, the same being shown as connected with one link of a chain. Fig. 2 is a fragmentary plan view showing the plate-like body formed with apertures for connection with one end of a trace strap.

Referring now to the drawing in detail, 1 designates a flat substantially rectangular plate-like body having one end curled upon itself to form a hook 2 adapted to engage the connecting staple on the hames or trace strap. Formed in the body 1 approximately centrally thereof is an opening 3, while formed on the end of the body opposite from the hook 2 is a hook 4 overlying the body and having the bill end terminating within the opening 3 at a point centrally of the opening. Stamped from the body 1 between the opening 3 and the hook 4 and projecting into the space between the body and the hook is a lug 5 spaced apart from the hook.

6 designates one link of a chain and to connect the chain to the hook one end of the link is passed into the opening 3 and slipped over the end of the hook in the opening and then the link is turned through an angle of forty-five degrees, more or less, and moved over the hook past the lug 5 and into engagement with the rear end of the hook, thereby connecting the link to the hook. The lug 5 acts as a stop to limit the backward movement of the link along the plate, while accidental disconnection of the link from the hook is prevented, owing to the fact that it is necessary to turn the link at an angle after the end thereof is disposed within the opening 3.

If desired, the plate-like body 1 may be formed with apertures as illustrated in Fig. 2, and the hook 2 eliminated, so that the plate may be riveted or otherwise secured to a trace strap.

I claim:

1. As a new article of manufacture, a harness hook constructed from a flat plate having one of its ends reduced and extended rearwardly of the plate to provide a hook, and the bill of the hook being projected downwardly toward the plate, said plate having an opening receiving the said bill of the hook, and said plate having an upstruck lug disposed between the opening and the outer end of the hook.

2. As a new article of manufacture, a harness hook formed from a plate having one of its ends rounded toward the plate and its opposite end reduced and extended over the face of the plate opposite that provided with the said rounded end, said hook having its inner end bent in the direction of the plate and the said bent end providing the bill of the hook, the plate having a round opening receiving the said bill, said plate between the bill and the outer end of the hook being slitted and the metal between the slits being upstruck to provide a lug, as and for the purpose set forth.

In testimony whereof I affix my signature in presence of two witnesses.

EDWARD B. KNAPP.

Witnesses:
ROBERT J. RAULSTON,
DELMER O. RECORD.

Copies of this patent may be obtained for five cents each, by addressing the "Commissioner of Patents, Washington, D. C."